United States Patent [19]

Vdoviak et al.

[11] Patent Number: 4,833,881
[45] Date of Patent: May 30, 1989

[54] GAS TURBINE ENGINE AUGMENTOR

[75] Inventors: John W. Vdoviak, Marblehead; Chester J. Lamando, Jr., Nahant, both of Mass.

[73] Assignee: General Electric Company, Lynn, Mass.

[21] Appl. No.: 682,526

[22] Filed: Dec. 17, 1984

[51] Int. Cl.[4] .............................................. F02K 11/00
[52] U.S. Cl. ........................................ 60/261; 60/757; 60/725
[58] Field of Search ................. 60/261, 752, 755, 757, 60/759, 725; 181/213

[56] References Cited

U.S. PATENT DOCUMENTS

| | | | |
|---|---|---|---|
| 2,525,206 | 10/1950 | Clarke | 60/752 |
| 3,712,062 | 1/1973 | Nash | 60/261 |
| 3,826,082 | 7/1974 | Smuland et al. | 60/757 |
| 3,866,417 | 2/1975 | Velegol | 60/261 |
| 3,974,647 | 8/1976 | Lewis et al. | 60/261 |
| 4,122,674 | 10/1978 | Andersson et al. | 60/725 |
| 4,222,233 | 9/1980 | Johnson et al. | 60/261 |

FOREIGN PATENT DOCUMENTS 802370 10/1958 United Kingdom ................ 60/725

*Primary Examiner*—Louis J. Casaregola
*Assistant Examiner*—T. Thorpe
*Attorney, Agent, or Firm*—Francis L. Conte; Derek P. Lawrence

[57] ABSTRACT

A new and improved gas turbine engine augmentor including a liner having a film-coolable first portion joined to a convection-coolable second portion is disclosed. A cooling gas, such as fan bypass air, is channeled to the liner for film cooling the first portion and providing a residual cooling film to the second portion. The second portion is also convection coolable by air passing over an outer surface thereof. In a particular embodiment of the invention, the augmentor liner also includes a screech portion disposed at an upstream end of the first portion and downstream of a flameholder. The screech portion includes a substantially imperforate outer wall and an inner wall spaced therefrom which define a manifold therebetween. The inner wall includes a plurality of apertures in flow communication with the combustion zone. The manifold and apertures are effective for suppressing screech while substantially preventing the leakage of cooling air therethrough.

28 Claims, 2 Drawing Sheets

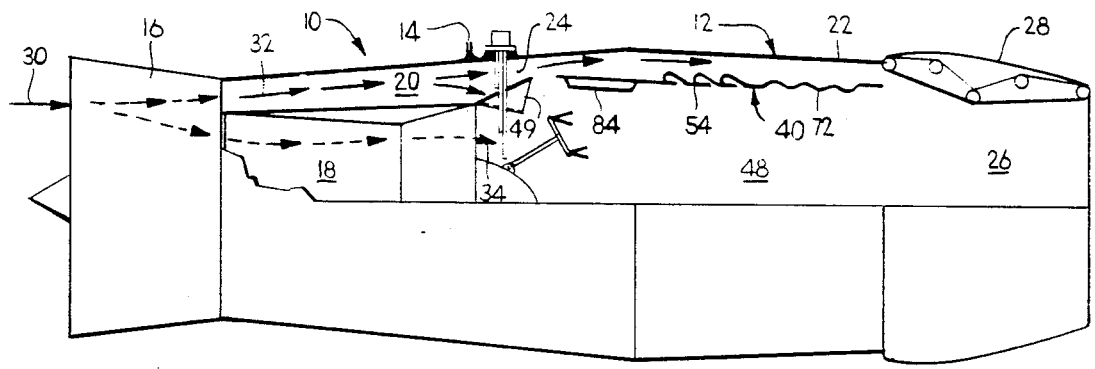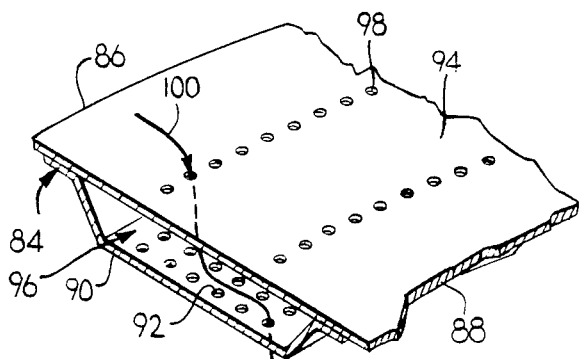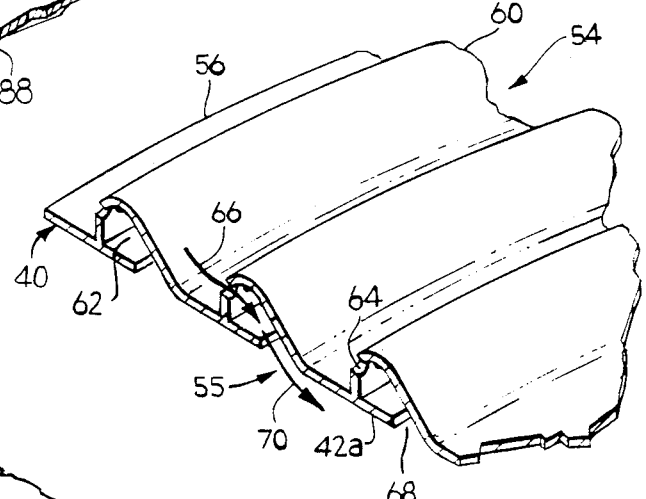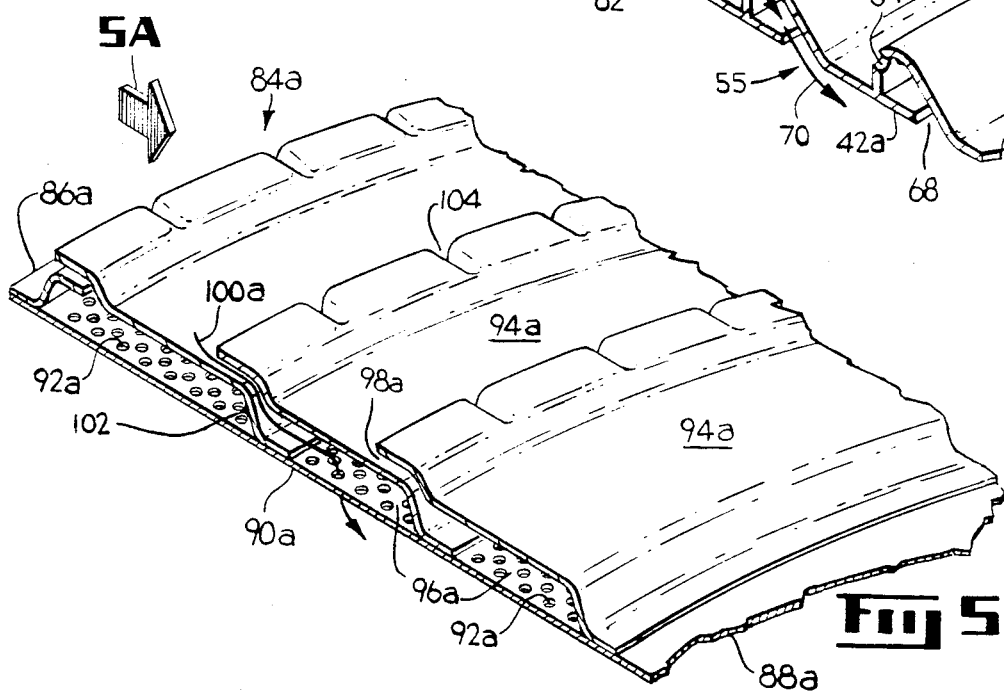

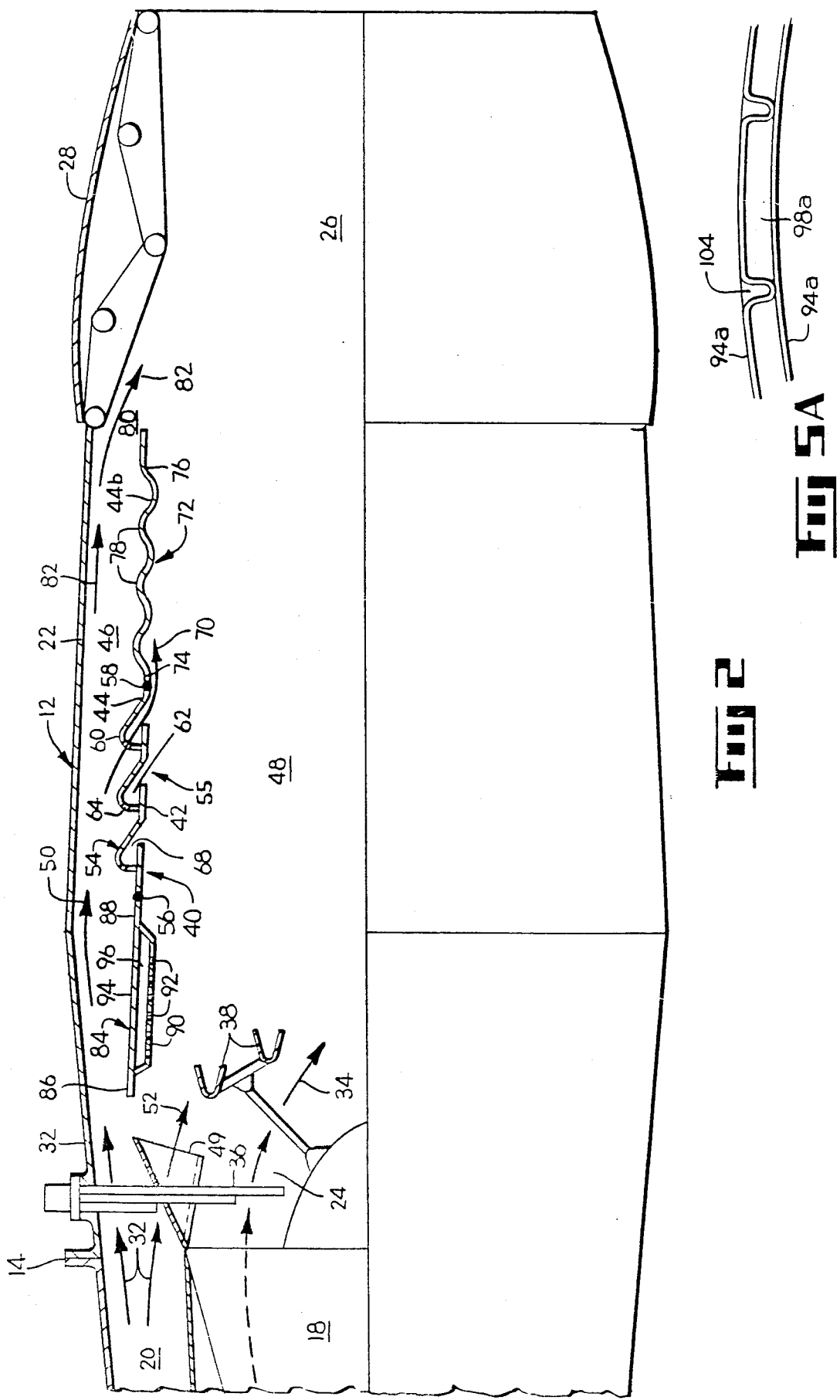

GAS TURBINE ENGINE AUGMENTOR

BACKGROUND OF THE INVENTION

The present invention relates generally to gas turbine engine augmentors, and, more particularly, to an improved augmentor liner requiring reduced amounts of cooling airflow and having improved screech suppression means.

Gas turbine engine augmentors including cooling liners therefor are known in the art. Various types of cooling liners are known which perform at various levels of efficiency. However, a cooling liner should be effective at least for shielding the structural augmentor casing from hot augmentor combustion gases, for providing cooling air to an exhaust nozzle disposed at the downstream end of the augmentor and for providing screech suppression in the augmentor.

Screech is a term known in the art which is simply defined as intense combustion induced, high-frequency pressure oscillations which, under certain conditions, are generated in the augmentor. See, for example, U.S. Pat. No. 3,041,836—J. C. Truman et al, "Means for Eliminating Screech in Jet Propulsion Systems," which is assigned to the present assignee and is incorporated herein by reference. Uncontrolled screech reduces the high-cycle fatigue life of the augmentor due to primarily three modes of screech-induced vibration including radial, circumferential, and axial modes, and combinations thereof.

Preferably, the augmentor cooling liner should provide casing thermal shielding and maintain acceptable levels of metal temperature consistent with durability and life requirements for the augmentor, while utilizing the least possible amount of engine cooling air.

More specifically, augmentor combustion efficiency is directly proportional to the amount of discharge gases available from the gas turbine engine. Accordingly, any engine discharge gases, fan bypass air, for example, utilized for cooling the augmentor liner and not used in the augmentor combustion process, decreases augmentor temperature capability and efficiency. It therefore becomes apparent that reducing the amount of cooling air required in the augmentor correspondingly increases augmentor efficiency.

However, augmentors are generally long structures when compared to engine size and must accommodate relatively high combustion gas temperatures, both of these conditions requiring a substantial amount of cooling air. Known in the art are gas turbine engine augmentors utilizing relatively highly effective film-cooling structures, such as are found in engine combustors. Film cooling is typically provided by circumferential film-cooling nuggets having slots which are placed in relatively close axial positions so that film-cooling effectiveness is maintained relatively high from one slot to the next.

Also known in the art are augmentors employing convection-cooled liners. However, convection-cooled liners are not as efficient as film-cooled liners and although they may utilize less cooling air, they are not suitably effective in advanced augmentors having relatively high combustion temperatures.

Augmentors also typically include some form of screech suppression means. For example, it is known to utilize a relatively high density of small holes in the forward section of a liner near the augmentor flameholder for suppressing screech. However, in one embodiment, these screech holes communicate with an augmentor bypass duct defined between an outer casing and the liner, and, therefore, result in leakage of cooling air through these holes into the augmentor. Although this leaking cooling air is effective for cooling the screech suppression means of the liner, it is less effective than film-cooling slots.

Accordingly, it is an object of the present invention to provide a new and improved gas turbine engine augmentor.

Another object of the present invention is to provide a new and improved augmentor liner requiring reduced amounts of cooling air for improving augmentor operating performance and efficiency.

Another object of the present invention is to provide an augmentor liner which more effectively apportions and utilizes available cooling air.

Another object of the present invention is to provide a new and improved augmentor liner having improved screech suppression means.

SUMMARY OF THE INVENTION

A new and improved gas turbine engine augmentor including a liner having a film-coolable first portion joined to a convection-coolable second portion is disclosed. A cooling gas, such as fan bypass air, is channeled to the liner for film cooling the first portion and providing a residual cooling film to the second portion. The second portion is also convection coolable by air passing over an outer surface thereof. The use of these liner first and second portions allows for a reduction in the amount of required cooling airflow compared to a liner having only film-cooling means throughout its axial length. In a particular embodiment of the invention, the augmentor liner also includes a screech portion disposed at an upstream end of the first portion and downstream of a flameholder. The screech portion includes a substantially imperforate outer wall and an inner wall spaced therefrom which define a manifold therebetween. The inner wall includes a plurality of apertures in flow communication with the combustion zone. The manifold and apertures are effective for suppressing screech while substantially preventing the leakage of cooling air therethrough.

BRIEF DESCRIPTION OF THE DRAWINGS

The novel features believed characteristic of the invention are set forth in the appended claims. The invention, itself, together with further objects and advantages thereof is more particularly described in the following detailed description taken in conjunction with the accompanying drawings in which:

FIG. 1 is a sectional view of a gas turbine engine including an augmentor in accordance with the present invention.

FIG. 2 is an enlarged sectional view of the augmentor illustrated in FIG. 1.

FIG. 3 is an isometric sectional view of a film-cooled portion of the liner illustrated in FIG. 1.

FIG. 4 is an isometric sectional view of a screech portion of the augmentor liner illustrated in FIG. 1.

FIG. 5 is an isometric sectional view of an alternate embodiment of the screech portion of the augmentor of FIG. 1.

FIG. 5A is a partial end view of the augmentor screech portion illustrated in FIG. 5.

DETAILED DESCRIPTION

Illustrated in FIG. 1 is an exemplary gas turbofan engine 10, of the fan bypass air type, including an augmentor or afterburner 12 according to one embodiment of the present invention. The augmentor 12 is suitably attached to the downstream end of the engine 10, for example, by an annular mounting flange 14. The engine 10 includes a fan 16 at an upstream end thereof and a core engine 18, which includes a compressor, combustor and turbine (not shown), disposed in flow communication with the fan 16. A fan bypass channel 20 is provided around the core engine 18.

The augmentor 12 includes a cylindrical outer casing 22 having an inlet 24 disposed at an upstream end thereof, and an outlet 26 at a downstream end thereof. A conventional exhaust nozzle assembly 28 having a plurality of circumferentially positioned variable flaps is suitably attached to the casing outlet 26.

The basic structure and operation of the augmented bypass flow type engine 10 are more fully described in U.S. Pat. No. 3,750,402—J. W. Vdoviak et al, assigned to the present assignee, and incorporated herein by reference.

Total engine airflow represented by the total of fan air 30 entering the fan 16; i.e., 100 percent, is suitably channeled through the engine 10. Exemplary proportions of gases flowing through the engine 10 and augmentor 12 are disclosed hereinafter for purposes of more fully appreciating advantages of the present invention. About 30 percent of the fan air 30 is channeled through the bypass channel 20 as fan bypass air 32, and about 70 percent of the fan air 30 is channeled through the core engine 18 and mixed with fuel to generate core gases 34 which are discharged from the core engine 18. The fan bypass air 32 represents a first portion of the total engine airflow 30, or, alternatively, of the total gases discharged from the engine 10, and the core gases 34 represent a complementary, second portion of the total engine airflow 30, or of the total gases discharged from the engine 10. The total engine discharge gases (i.e., bypass air 32 and core gases 34) are then suitably channeled from the bypass channel 20 and core engine 18 to the augmentor 12.

The augmentor 12, in accordance with a preferred, exemplary embodiment of the present invention as more particularly illustrated in FIG. 2, includes a plurality of circumferentially spaced fuel injectors 36 disposed in the inlet 24. A conventional annular flameholder 38 is disposed downstream of the fuel injectors 36. The augmentor 12 further includes an annular afterburner cooling liner 40 having a radially inner surface 42 and a radially outer surface 44. The casing 22 and the liner outer surface 44 define a cooling passage 46, or augmentor bypass duct 46, therebetween and the liner inner surface 42 defines an annular augmentor combustion zone 48.

The augmentor 12 further includes a conventional daisy chute mixer 49 suitably joined to the core engine 18 and extending to and spaced from an upstream end of the combustor liner 40. The fan bypass channel 20 is disposed in suitable flow communication with the augmentor bypass duct 46 and the mixer 49 so that a portion of the fan bypass air 32 is channeled to the bypass duct 46 as bypass duct cooling air 50. A remaining portion of the bypass air 32 is channeled through the mixer 49 toward the flameholder 38 in the inlet 24 as augmentor combustion air 52.

For comparison purposes only, tests indicate that the present invention allows for a reduced amount of bypass duct cooling air 50, representing about 10 percent of the total engine airflow 30, with the combustion air 52 representing about 20 percent of the total engine airflow 30. The combustion air 52 is channeled to the flameholder 38 and joins the core gases 34, which in combination represent about 90 percent of the total engine airflow 30. Tests also show that for comparable operating conditions, including augmentor liner temperatures in the range of about 1100° F. to about 1500° F., a conventional augmentor design having primarily only film-cooling means requires bypass duct air 50 representing about 15 percent of the airflow 30 to adequately cool the liner thereof, with only 15 percent of the airflow 30 used as combustion air 52. As a direct result of the present invention, tests suggest that bypass duct air 50 can be reduced from 15 percent to about 10 percent, a ⅓ reduction, and the combustion air 52 can be increased from 15 percent to about 20 percent for increasing the performance of the augmentor 12 while maintaining acceptable cooling of the liner 40 within such liner temperature range. Test results also suggest at least about a 5 percent increase in augmentor efficiency from such a reduction in flow of bypass duct cooling air 50.

More specifically, and referring to FIGS. 2 and 3, the augmentor liner 40 in accordance with one embodiment of the present invention includes a first portion 54, having conventional film-cooling means 55, disposed downstream of the flameholder 38. The first portion 54 includes an upstream end 56 and a downstream end 58. The film-cooling means 55 includes a plurality of axially spaced, circumferentially extending cooling nuggets 60, each including portions defining a circumferentially extending annular pocket 62. The nuggets 60 also include a plurality of circumferentially spaced inlet ports 64 disposed therein in flow communication with the bypass duct 46. The nuggets 60 are predeterminedly sized for collectively receiving a first portion 66 of the bypass duct air 50 and channeling it through an inwardly facing film slot 68 of the nugget 60 for generating a cooling boundary layer of air 70 along the liner first portion inner surface 42a.

As illustrated in FIG. 2, the liner 40 further includes a substantially imperforate convection-coolable second portion 72 extending from the downstream end 58 to the casing outlet 26. The liner second portion 72 includes an upstream end 74 suitably connected to the downstream end 58 of the liner first portion 54, and a downstream end 76. The liner second portion 72 preferably comprises a plurality of circumferentially extending, axially spaced, generally wave-shaped stiffening convolutions 78. The downstream end 76 is spaced upstream from the nozzle assembly 28 for defining an annular discharge port 80 of the augmentor bypass duct 46.

A second portion 82 of the bypass duct air 50, which remains after the first portion 66 is channeled through the ports 64, is flowable over the outer surface 44b of the liner second portion 72 for convection cooling thereof. The second air portion 82 is then channeled out the discharge port 80, which is suitably arranged and sized for generating film cooling of the flaps of the nozzle assembly 28. In accordance with one embodiment of the invention, the bypass air second portion 82 represents about 7 percent of the total engine airflow 30, which along with the bypass air first portion 66 of about 3 percent, represents the total bypass duct air 50 of about 10 percent thereof.

It should be appreciated that for effectively cooling the liner 40 and the exhaust nozzle 28, the nugget inlet ports 64 and the bypass duct discharge port 80 are predeterminedly sized for collectively channeling therethrough substantially all of the bypass duct air 50. Additional cooling air flows are not required.

Another significant element of the present invention, as illustrated in FIGS. 2 and 4, is means for suppressing screech. Or alternatively, a screech, third liner portion 84, disposed downstream of the flameholder 38 and extending downstream to the upstream end 56 of the liner first portion 54. The screech suppression means 84 is effective for suppressing screech in the augmentor 12 and includes an upstream end 86 suitably mounted to the casing 22 and a downstream end 88 suitably connected to the upstream end 56 of the liner first portion 54. The liner third portion 84 further includes a radially inwardly facing cylindrical inner wall 90 having a plurality of apertures 92 disposed in flow communication with the combustion zone 48 and sized and patterned for suppressing screech. The third liner portion 84 also includes a radially outwardly facing outer wall 94 which is spaced from the inner wall 90 for defining therebetween a preferably empty manifold 96, and spaced from the casing 22 for defining a portion of the bypass duct 46. The third liner portion 84 is effectively convection coolable by the bypass duct air 50 flowable thereover. The manifold 96 and the apertures 92 are predeterminedly sized for reducing screech in the augmentor 12.

It should be appreciated that the outer wall 94 of the liner screech portion 84 is preferably imperforate and therefore does not allow leakage of the bypass duct air 50 from the bypass duct 46 and into the combustion zone 48. Eliminating airflow leakage through the screech portion 84 improves augmentor efficiency.

However, the outer wall 94 may be substantially imperforate but yet include a plurality of substantially small purge holes 98, as shown in FIG. 4, which are effective for preventing backflow of gases from the combustion zone 48 into the manifold 96. Backflow is undesirable because, for example, it allows a fuel/air mixture to collect in the manifold 96 and form undesirable deposits therein which may degrade screech performance. Accordingly, the purge holes 98, are sized for providing a substantially small amount of flow; i.e, a third portion 100 of the bypass duct air 50 representing about ½ percent of the total engine airflow 30.

Accordingly, it will be appreciated that an augmentor 12 in accordance with the present invention provides new elements and cooperation of elements which provide for reduction in the amount of air needed for cooling the liner 40 while providing improved screech suppression means 84. In particular, whereas conventional screech suppressors typically included a plurality of holes which leak bypass duct air into the combustor, a screech liner portion 84 of the present invention reduces this flow to a minimum or none at all. It has been discovered that the cooling effect of the air passing through conventional screech means, required in high-temperature applications wherein liner temperatures must be maintained at temperatures below about 1500° F., is not required for the screech liner portion 84. It is believed that inasmuch as the screech liner portion 84 is disposed immediately downstream of the flameholder 38 and upstream of the center portion of the combustion zone 48, it is not subject to relatively high temperatures, and, therefore, convection cooling of the outer wall 94 is adequate for maintaining acceptable metal temperature of the liner portion 84.

Furthermore, by providing both a film-coolable liner portion 54 and an imperforate convection-coolable liner portion 72 in the predetermined cooperation illustrated, cooling airflows can be reduced. It should be noted that initial engine tests of two augmentor liner designs were conducted for evaluating their performance in a particular augmented bypass flow engine such as engine 10.

In one test, an all film-cooled liner having screech suppression holes exhibited good screech suppression capability.

In the other test, a convoluted convection-cooled liner portion (such as liner portion 72) was disposed at an upstream end of the liner and a film cooled liner portion (such as liner portion 54) was disposed downstream thereof. This convection/film liner was unacceptable for this engine in that screech and undesirable hot streaks occurred.

It was deduced from these tests that properly positioned film-cooling nuggets are effective additionally for reducing screech and that a combination liner including an upstream film-cooled portion and a downstream convection-cooled portion could reduce screech, provide acceptable cooling of the liner without hot streaks, and reduce the amounts of cooling airflow required.

Accordingly, by utilizing the screech liner portion 84, to provide additional reduction of screech, followed downstream in turn by the film-coolable portion 54 and the convection-coolable portion 72, it has been discovered that improved performance of the augmentor 12 can be achieved with reduced amounts of cooling air.

In particular, inasmuch as the film-coolable portion 54 is centrally located in the augmentor 12 and is positioned in general radial alignment (i.e., at the same axial positions) with the center of the combustion zone 48 having the highest radiation heat loading, the relatively high cooling effectiveness of film cooling is most effectively utilized. By positioning the convection-coolable liner portion 72 at the downstream end of the augmentor 12, convection cooling, which is relatively less effective as compared with film cooling, is adequate for the relatively lower radiation heat loading experienced in this region.

Furthermore, the liner portion 72 is thereby also located where the pressure of the bypass duct air second portion 82 is relatively greater than that of combustion gases in the zone 48, which decrease in the downstream direction. Accordingly, inasmuch as convection heat transfer is greater at increased differential pressure, the liner portion 72 is more effectively cooled at the downstream position than if it were located at an upstream end of the liner 40 and upstream of the film-coolable portion 54. The liner portion 72 also takes advantage of a residual cooling air boundary layer from the liner portion 54 disposed upstream therefrom for providing additional cooling thereof (see film air 70 in FIG. 2).

Illustrated in FIGS. 5 and 5A is an alternate, preferred embodiment 84a of the screech liner portion 84 illustrated in FIGS. 2 and 4, which includes a plurality of axially spaced, circumferentially extending partitions 102 extending between the inner and outer walls 90a and 94a, for defining a pluralilty of axially spaced manifold compartments 96a. In this embodiment, the outer wall 94a includes a substantially small, annular inlet aperture or slot 98a. The wall 94a preferably includes a plurality of circumferentially spaced indentations 104 at an upstream end thereof which contact a downstream end of an adjacent wall 94a to divide the slot 98a into a plurality of circumferentially spaced portions. Inasmuch as differential pressure acting across the liner 40 shown in FIG. 2 varies in the axial direction, the manifold compartments 96a can be predeterminedly sized in conjuction with the apertures 92a and 98a for accommodating axial variations in pressure drop across the screech liner portion 84a to further minimize leakage of air through the apertures 92a while preventing backflow.

Although preferred embodiments of the present invention have been disclosed, other embodiments will become apparent to those skilled in the art from the teachings herein. For example, although fan bypass air is used, a cooling gas for cooling the augmentor liner 40 comprising the core gases 34 could also be used. Furthermore, other types of film coolable and convection-coolable liner portions may also be used.

Having thus described the invention, what is desired to be secured by Letters Patent of the United States is:

We claim:

1. An augmentor for a gas turbine engine comprising:
    an outer casing having an inlet for receiving engine discharge gases and an outlet for discharging said gases from said augmentor;
    a fuel injector disposed in said casing inlet;
    a flameholder disposed in said casing inlet and downstream of said injector; and
    an annular augmentor liner having radially inner and outer surfaces and being spaced radially inwardly of said casing, said liner outer surface and said casing defining an annular bypass duct therebetween for channeling therethrough a first portion of said engine discharge gases as bypass duct gases from said casing inlet and through said casing outlet, and said liner inner surface defining an annular augmentor combustion zone, said liner including:
    a first portion having film-cooling means and disposed downstream of said flameholder; and
    an imperforate second portion extending from a downstream end of said first portion to casing outlet and having means for convection cooling said second portion comprising an outer surface of said second portion disposable in flow contact with said bypass duct gases.

2. An augmentor according to claim 1 wherein:
    said film-cooling means of said liner first portion comprises a plurality of axially spaced nuggets each including portions defining a radially outwardly extending annular pocket and having a plurality of circumferentially spaced inlet ports disposed in flow communication with said bypass duct for receiving a first portion of said bypass duct gases, said nugget portions further defining a slot disposed in flow communication with said pocket for discharging a cooling boundary layer of gas along said liner first portion inner surface; and
    said liner second portion comprises a plurality of circumferentially extending axially spaced convolutions.

3. An augmentor according to claim 2 further including an exhaust nozzle assembly extending downstream from said outer casing and said augmentor liner, said nozzle assembly having flaps disposed at said casing outlet and in flow communication therewith, and wherein said liner second portion further includes a downstream end spaced upstream of said nozzle assembly for defining an annular discharge port of said augmentor bypass duct for channeling a second portion of said bypass duct gases as a cooling boundary layer of gas along an inner surface of said nozzle assembly flaps.

4. An augmentor according to claim 3 wherein said nugget inlet ports and said duct discharge port collectively provide means for channeling therethrough substantially all of said bypass duct gases.

5. An augmentor according to claim 2 wherein said gas turbine engine includes a fan bypass channel and said augmentor bypass duct is disposable in flow communication therewith for receiving fan bypass air flowable from said gas turbine engine.

6. An augmentor to claim 1 wherein said augmentor liner further includes means for suppressing screech in said augmentor disposed between said flameholder and said liner first portion.

7. An augmentor according to claim 1 wherein said augmentor liner further includes a third portion disposed downstream of said flameholder and extending downstream to an upstream end of said first liner portion, said line third portion including means for suppressing screech in said augmentor.

8. An augmentor according to claim 7 wherein said means for suppressing screech includes radially inwardly facing wall of said liner third portion having a plurality of apertures in flow communication with said combustion zone.

9. An augmentor according to claim 8 wherein said means for suppressing screech further includes a radially outer wall of said liner third portion spaced from said inner wall and defining therebetween a manifold.

10. An augmentor according to claim 9 wherein said inner wall apertures are circular and face substantially radially inwardly.

11. An augmentor according to claim 9 wherein said outer wall is imperforate.

12. An augmentor according to claim 9 wherein said outer wall includes only a plurality of substantially small purge holes for receiving gases from said bypass duct for preventing backflow of gases from said combustion zone into said manifold.

13. An augmentor according to claim 9 wherein said liner third portion further includes a plurality of axially spaced circumferentially extending partitions extending between said inner and outer walls for defining a plurality of annular manifold compartments for accommodating axial varitaions in pressure drop across said screech portion.

14. An augmentor according to claim 1 wherein said augmentor liner further includes means for suppressing screech comprising an upstream end portion of said liner disposed downstream of said flameholder and including radially spaced inner and outer walls defining a manifold therebetween, said inner wall having a plurality of circular apertures therein facing in substantially radially inward directions and being in flow communication with said combustion zone; and
    wherein said outer wall includes a plurality of substantially small purge holes for preventing backflow of gases from said combustion zone into said manifold.

15. An augmentor for a gas turbine engine comprising:

an outer casing having an inlet for receiving engine discharge gases and an outlet for discharging said gases from said augmentor;

a fuel injector disposed in said casing inlet;

a flameholder disposed in said casing inlet and downstream of said injector; and an annular augmentor liner having radially inner and outer surfaces and spaced radially inwardly of said casing, said liner outer surface and said casing defining a bypass duct therebetween for channeling therethrough a first portion of said engine discharge gases as bypass duct gases form said casing inlet to said casing outlet, and said liner inner surface defining an annular augmentor combustion zone, said liner including:

a first portion having film-cooling means and disposed downstream of said flameholder; and an imperforate second portion extending from a downstream end of said first portion to said casing outlet and having means for convection cooling said second portion comprising an outer surface of said second portion disposable in flow contact with said bypass duct gases; and a third portion disposed downstream of said flameholder and extending downstream to an upstream end of said liner first portion, said third portion including means for suppressing screech in said augmentor comprising a radially inwardly facing cylindrical wall of said liner third portion having a plurality of apertures in flow communication with said combustion zone and a substantially imperforate radially outer wall of said liner third portion spaced from said inner wall and defining therebetween a manifold.

16. An augmentor according to claim 15 wherein:

said film-cooling means of said liner first portion comprises a plurality of axially spaced nuggets each including portions defining a radially outwardly extending annular pocket and having a plurality of circumferentially spaced inlet ports in flow communication with the bypass duct bypass duct gases, said nugget further defining a slot disposed in flow communication with said pocket for discharging a cooling boundary layer of gas along said liner first portion inner surface;

said augmentor further includes an exhaust nozzle assembly extending downstream from said casing and said augmentor liner, said nozzle assembly having flaps disposed at said casing outlet and in flow communication therewith;

said liner second portion further includes a downstream end spaced upstream of said nozzle assembly for defining an annular discharge port of said augmentor bypass duct for channeling a second portion of said bypass duct gases as a cooling boundary layer of gas along an inner suface of said nozzle assembly flaps; and said nugget inlet ports and said duct discharge port collectively providing means for channeling therethrough all of said bypass duct gases.

17. An augmentor according to claim 16 wherein said gas turbine engine includes a fan bypass channel and said augmentor bypass duct is disposable in flow communication therewith for receiving fan bypass air flowable form said gas turbine engine.

18. An augmentor, for a gas turbine engine having a fan bypass channel for channeling fan bypass air, comprising:

an outer casing having an inlet for receiving total engine airflow including said fan bypass air and an outlet for discharging said airflow from said augmentor;

an exhaust nozzle assembly having flaps disposed at said casing outlet and in flow communication therewith;

a fuel injector disposed in said casing inlet;

a flameholder disposed in said casing inlet and downstream of said injector; and an annular augmentor liner having radially inner and outer surface and spaced radially inwardly of said casing, said liner outer surface and said casing defining a bypass duct therebetetween for channeling therethrough said fan bypass air from said casing inlet to said casing outlet, said liner inner surface defining an annular augmentor combustion zone, said liner further including:

a first portion having film-cooling means, disposed downstream of said flameholder, which comprise a plurality of axially spaced nuggets each including portions defining a radially outwardly extending annular pocket and having a plurality of circumferentially spaced inlet ports in flow communication with said bypass duct for receiving a first portion of bypass duct air, said nugget portions further defining a slot disposed in flow communication with said pocket for discharging a cooling air boundary layer along said liner first portion inner surface;

an imperforate second portion extending from a downstream end of said first portion to said casing outlet and having a plurality of circumferentially extending axially spaced convolutions, said liner second portion including means for convection cooling said second portion comprising an outer surface of said second portion disposable in contact with said bypass duct air for being coolable in convection by said bypass duct air;

said liner second portion further including a downstream end spaced upstream of said nozzle assembly for defining an annular discharge port of said augmentor bypass duct for channeling a second portion of said bypass duct air as a cooling air boundary layer along said nozzle assembly flaps, said nugget inlet ports and said duct discharge port collectively providing means for channeling therethrough substantially all of said by pass duct air; and a third portion disposed downstream of said flameholder and extending downstream to an upstream end of said first liner portion, and including means for suppressing screech in said augmentor comprising a radially inwardly facing wall of said liner third portion having a plurality of apertures in flow communication with said combustion zone and a radially outer wall of said liner third portion spaced from said inner wall and defining therebetween a manifold, said radially outer wall including a plurality of substantially small purge holes for preventing backflow of gases from said combustion zone into said manifold.

19. For a gas turbine engine augmentor including a liner defining a combustion zone, a casing spaced radially outwardly of said liner and defining a bypass duct therebetween and a flameholder disposed at an inlet of said casing, an improved liner comprising;

a screech portion positionable downstream of said flameholder and having means for suppressing screech in said augmentor;

a first portion having means for film cooling said first portion and being fixedly connected to and disposed downstream of said screech portion; and an imperforate second portion fixedly connected to and disposed downsteam of said first portion and having means for convection cooling said second portion 20. An augmentor liner according to claim 19 wherein:

said means for suppressing screech includes a radially inwardly facing cylindrical wall of said liner screech portion having a plurality of apertures in flow communication with said combustion zone and a radially outwardly facing wall of said liner screech portion spaced from said inner wall and defining therebetween a manifold;

said film-cooling means of said first portion includes a plurality of axially spaced nuggets, each including portions defining a radially outwardly extending annular pocket and having a plurality of circumferentially spaced inlet ports in flow communication with said bypass duct, said nugget portions further defining a slot disposed in flow communication with said pocket; and said second portion includes a plurality of circumferentially extending axially spaced convolutions and said connection cooling means includes an outer surface of said liner second portion disposable in flow contact with gases flwoable in said bypass duct.

21. An augmentor according to claim 1 wherein said bypass duct is sized for receiving about 10 percent of all said engine discharge gases entering said casing inlet as said bypass duct gases while maintaining temperatures of said augmentor liner below about 1500° F. during operating conditions.

22. An augmentor according to claim 16 wherein said bypass duct is sized for receiving about 10 percent of all said engine discharge gases entering said casing inlet as said bypass duct gases while maintaining temperatures of said augmentor liner below about 1500° F. during operation conditions.

23. An augmentor according to claim 18 wherein said bypass duct is sized for receiving about 10 percent of said total engine airflow as said bypass duct gases while maintaining temperatures of said augmentor liner below about 1500° F. during operating conditions.

24. An augmentor according to claim 18 wherein said nugget inlet ports and said bypass duct discharge port are sized so that said first and second portions of bypass duct air are about 3 percent and 7 percent, respectively, of said total engine airflow while maintaining temperatures of said augmentor liner below about 1500° F. during operating conditions.

25. An augmentor according to claim 16 wherein said liner first portion is centrally located in said augmentor and is positioned in general radial alignment with a center of said combustion zone.

26. An augmentor according to claim 16 wherein said liner first portion is positioned in said augmentor in alignment with a portion of said combustion zone having the highest radiation heat loading.

27. An augmentor according to claim 12 wherein said purge holes are sized for collectively channeling about ½ percent of all said engine discharge gases entering said casing inlet.

28. An augmentor according to claim 1 wherein said liner first and second portions have generally the same length in an axial direction.

* * * * *

UNITED STATES PATENT AND TRADEMARK OFFICE
CERTIFICATE OF CORRECTION

PATENT NO. : 4,833,881
DATED : May 30, 1989
INVENTOR(S) : John William Vdoviak et al It is certified that error appears in the above-identified patent and that said Letters Patent is hereby corrected as shown below:

In Claim 7, column 8, line 25, change "line" to --liner--.
In Claim 17, column 9, line 65, change "form" to --from--.
In Claim 18, column 10, line 12, change "surface" to --surfaces--.
In Claim 18, column 10, line 49, change "by pass" to --bypass--.
In Claim 1, column 7, line 44, before "casing" add --said--.
In Claim 8, column 8, line 28, before "radially" add --a--.
In Claim 16, column 9, line 41, after "duct" add --for receiving a first portion of--.
In Claim 16, column 9, line 42, before "further" add --portions--.
In Claim 20, column 11, line 30, change "connection" to --convection--.
In Claim 20, column 11, line 32, change "flwoable" to --flowable--.
In Claim 22, column 12, line 8, change "operation" to --operating--.

Signed and Sealed this

Ninth Day of October, 1990

Attest:

HARRY F. MANBECK, JR.

*Attesting Officer*  *Commissioner of Patents and Trademarks*